(12) United States Patent
Hasegawa et al.

(10) Patent No.: US 8,020,677 B2
(45) Date of Patent: Sep. 20, 2011

(54) VIBRATION DAMPING DEVICE AND MANUFACTURING METHOD THEREOF

(75) Inventors: Koichi Hasegawa, Kasugai (JP); Atsushi Muramatsu, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 743 days.

(21) Appl. No.: 12/216,413

(22) Filed: Jul. 3, 2008

(65) Prior Publication Data
US 2009/0008201 A1    Jan. 8, 2009

(30) Foreign Application Priority Data
Jul. 4, 2007    (JP) ................................. 2007-176803

(51) Int. Cl.
*F16F 15/08* (2006.01)
(52) U.S. Cl. ...................................................... 188/378
(58) Field of Classification Search ................... 188/278, 188/379, 380; 248/634, 674
See application file for complete search history.

(56) References Cited

U.S. PATENT DOCUMENTS

| 5,887,843 | A | 3/1999 | Hidekawa et al. |
| 6,439,359 | B1 | 8/2002 | Kato et al. |
| 6,854,721 | B2 | 2/2005 | Kato et al. |
| 6,991,077 | B2 | 1/2006 | Maeno et al. |
| 7,264,097 | B2 * | 9/2007 | Yasumoto et al. ............ 188/379 |
| 7,546,998 | B2 * | 6/2009 | Chen .............................. 248/674 |
| 2007/0221460 | A1 * | 9/2007 | Guo et al. ...................... 188/378 |

FOREIGN PATENT DOCUMENTS

| WO | WO 91/00967 A1 | 1/1991 |
| WO | WO 93/08414 A1 | 4/1993 |

OTHER PUBLICATIONS

European Search Report issued in European Patent Application No. 08011852.4 on Dec. 21, 2009.

* cited by examiner

*Primary Examiner* — Bradley King
(74) *Attorney, Agent, or Firm* — Oliff & Berridge, PLC

(57) ABSTRACT

A vibration damping device including a hollow housing having a fastening frame and a housing main body attached to the fastening frame for providing the hollow housing enclosing a mass member. With the housing main body inserted between top and base plate portions through an opening in the fastening frame, an urging force of a first spring projection is directed against the housing main body from one of the top base plate portions towards the other thereby holding the housing main body pressed against the other of the top and base plate portions, while an urging force of a second spring projection is directed against the housing main body towards the opening side from a back plate portion causing the housing main body to become engaged by a catch projection, for attaching the housing main body to the fastening frame and preventing it from slipping out through the opening of the fastening frame.

10 Claims, 5 Drawing Sheets

VIBRATION DAMPING DEVICE AND MANUFACTURING METHOD THEREOF

INCORPORATED BY REFERENCE

The disclosure of Japanese Patent Application No. 2007-176803 filed on Jul. 4, 2007 including the specification, drawings and abstract is incorporated herein by reference in its entirety.

BACKGROUND OF THE INVENTION

1. Field of the Invention

The present invention relates to a vibration damping device adapted to provide vibration damping effect based on the striking action associated with bouncing displacement of an independent mass member housed within a hollow housing; and to a method for manufacturing such a device.

2. Description of the Related Art

One type of vibration damping device known to date is a vibration damping device of bouncing type having an independent, bouncing displacement-capable mass member accommodated within a housing that is fixedly attached to a component target for damping, and designed to afford vibration damping action through the impact energy and attenuation action produced when the independent mass component bounces inside the housing and repeatedly strikes against the housing upon input of vibration. Such as design is disclosed in U.S. Pat. No. 6,439,359, for example.

In such vibration damping devices of bouncing type, with a view to improving attenuating capability in order to more advantageously achieve vibration damping action, as well as achieving effective vibration damping action over a wide range of frequencies, it is effective to establish the distance between the outside peripheral face of the independent mass component and the inside peripheral face of the housing with a high degree of accuracy. That is, a high degree of dimensional accuracy is required at the inside peripheral face of the housing.

However, with the vibration damping device shown in the aforementioned U.S. Pat. No. 6,439,359, since the housing is fastened directly to the damped component through bolting, welding, or the like, it will be necessary for the housing to have sufficient strength in order to avoid diminished durability due to high stress in the fastened section. As a result, the housing is required to have both high strength and a high degree of dimensional accuracy as mentioned above, leading to an inherent problem that manufacture tends to be difficult owing to this fact. Specifically, where it is attempted, for example, to achieve dimensional accuracy without excessively high cost by using synthetic resin as the material for the housing, a difficulty of ensuring adequate strength as compared with a housing of metal or the like will be a problem that is typically encountered. Meanwhile, if the housing produced using metal or the like, the machining and structure necessary for achieving dimensional accuracy will be more complicated, with the risk of higher costs as compared with a housing of synthetic resin or similar material.

Moreover, the sections which fasten the vibration damping device to the damped component are disposed on the housing. Therefore, in the case when a vibration damping device is intended for installation on several different kinds of damped components, for example, some redesign of the housing will be necessary, even if the dimensions of the inside peripheral face of individual housings do not need to be redesigned, since the fastening structure to the different damped components will be different. A resultant problem is difficulty in achieving the advantages associated with improved production efficiency and lower cost.

SUMMARY OF THE INVENTION

It is therefore one object of this invention to provide a vibration damping device of novel structure whereby both high dimensional accuracy and high strength may be achieved at relatively low cost in a hollow housing that is adapted for fixed attachment to a component target for damping, and that houses an independent mass member; as well as a method for manufacturing such a vibration damping device.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

The principle of the present invention provides a vibration damping device including: a hollow housing adapted to be fastened to a component targeted for damping, and having an accommodating space; and an independent mass member which is accommodated independently within the hollow housing without being fastened thereto, the vibration damping device adapted to produce vibration damping action based on the independent mass member striking against the hollow housing. The hollow housing includes a fastening frame for fastening to the component targeted for damping, and a housing main body providing the accommodating space formed in an interior thereof and intended for attachment to the fastening frame. The fastening frame is a press-formed component of a metal plate that has been bent into a "U" shape, and includes: a base plate portion furnished with a section for fastening to the component targeted for damping; a top plate portion disposed spaced apart from and in opposition to the base plate portion; a back plate portion formed connecting the base plate portion with the top plate portion; side panel portions that respectively project inward at widthwise edges of the base, top and back plate portions, and extend between the base, top, and back plate portions; and an opening for insertion of the housing main body formed between edge portions of the base plate portion and the top plate portion on sides thereof opposite from the back plate portion. A first spring projection and a second spring projection that project inward are integrally formed on the back plate portion and on one of the base plate portion and the top plate portion of the fastening frame, and a catch projection that projects inward is integrally formed on an other of the base plate portion and the top plate portion. With the housing main body inserted between the opposing faces of the top plate portion and the base plate portion through the opening in the fastening frame, an urging force of the first spring projection is directed against the housing main body from one of the top plate portion and the base plate portion towards the other thereby holding the housing main body pressed against the other of the top plate portion and the base plate portion, while an urging force of the second spring projection is directed against the housing main body towards the opening side from the back plate portion causing the housing main body to become engaged by the catch projection, for attaching the housing main body to the fastening frame and preventing it from slipping out through the opening of the fastening frame.

In the vibration damping device of structure according to the present invention, the hollow housing is constituted by a housing main body which accommodates the independent mass member therein and is attached to a fastening frame. The hollow housing is mounted onto the component to be damped by fastening this fastening frame to the component to be damped. Since the fastening frame and the housing main body are separate structures, it will be possible to independently modify the design of each. Consequently, the fastening frame can be fabricated easily without the need to consider the shape of the accommodating space for the independent mass member. In particular, it will be possible to use a press-formed component as the fastening frame, thus affording dramatically shorter processing time as compared with fabrication through casting or cutting processes, and making volume production possible. Meanwhile, since there is no need to provide the housing main body with a section for fastening to the component to be damped, freedom in design can be improved with no need to consider the shape or strength of the section thereof for fastening to the component to be damped; and it will be possible to impart better dimensional accuracy to the accommodating space as compared with designs that emphasize strength, and consequently to improve the degree of freedom in tuning of vibration damping action based on the independent mass member striking against the component to be damped via the housing main body and the fastening frame.

Namely, the fastening frame and the housing main body can be redesigned in a mutually independent fashion. Therefore, in cases where, for example, the vibration damping device is to be employed for several different types of components to be damped respectively having different fastening structures, it will be possible to employ the same structure for the housing main body while individually redesigning the fastening frame only; or where modifying the tuning of the vibration damping action, it will be possible to replace only the housing main body with a housing main body having another structure (e.g. one with a independent mass member of different size). That is, according to the structure, it will be possible to redesign independently either the section for fastening to the component to be damped, or the accommodating space for the independent mass member, and to thereby achieve improved manufacturing efficiency and lower costs.

In particular, with the structure herein, the housing main body is attached to the fastening frame through insertion between opposing faces of the top plate portion and the base plate portion of the fastening frame, and retaining it therein utilizing the urging force of the first spring projection and the second spring projection, and the catch structure of the catch projection. Accordingly, the procedure for attaching the housing main body to the fastening frame is simpler in comparison with an attachment structure employing fastening bolts, welds, or the like.

Moreover, because the spring projections and the catch projection are integrally formed with the fastening frame, an increase in the number of attachment points can be avoided, thus affording the advantage of lower cost. Further, the strength of the press-formed fastening frame can be utilized to ensure good strength on the part of the projections, thereby improving stability of attachment of the housing main body to the fastening frame.

Furthermore, by forming side plate portions which extend between the base plate portion, the top plate portion, and the back plate portion at the two widthwise edges of the fastening frame, sufficient strength of the fastening frame will be assured, despite having been machined in order to form the spring projections and the catch projection. Moreover, these side plate portions may be press-formed simultaneously with forming of the fastening frame, so there will be no associated increase in the number of parts.

Additionally, the pair of side plate portions are utilized to inhibit the housing main body from slipping out in the widthwise direction from between the opposed faces of the top plate portion and the base plate portion of the fastening frame. This arrangement affords greater stability during the procedure of guiding in the housing main body from the opening towards the back plate portion and attaching it secured between the opposed faces of the top plate portion and the base plate portion, as well as affording greater stability with the housing main body attached to the fastening frame. That is, the side plate portions have the function of reinforcing the fastening frame, as well as the function of positioning the housing main body relative to the fastening frame, thereby affording a superior vibration damping device with a smaller number of parts.

For this reason, the vibration damping device of the present invention ensures that the two functions of strength on the one hand and dimensional accuracy required of the hollow housing on the other may be separated from one another. Thus, on the basis of technical ideas directed to meeting each of these requirements at a high level, it will be possible on the housing main body end to achieve the desired dimensional accuracy while on the fastening frame end to ensure the desired strength. Moreover, owing to the simple attachment structure of the fastening frame and the housing main body, it will be possible to advantageously achieve a vibration damping device that meets both of these requirements with relatively low cost.

In particular, a press-formed component is employed as the fastening frame and the projections for fastening the housing main body are integrally formed on the press-formed component. This arrangement makes it possible to achieve greater ease of manufacture and suitability to mass production. Additionally, the press-formed fastening frame is formed with the side plate portions, and is attached to the housing main body in a state of intimate contact, whereby rigidity of the press-formed component will be effectively assured and the vibration damping action produced by impact energy associated with striking of the independent mass member will be transmitted effectively from the fastening frame to the component being damped.

Preferably, the vibration damping device according to the present invention will employ a structure wherein at least one of the first spring projection, the second spring projection, and the catch projection is formed by cutting and bending a part of the fastening frame. This arrangement makes it possible to achieve through a simple structure an arrangement whereby the projections project inwardly from the fastening frame, and whereby the projections are endowed with resilience if needed.

Preferably, the vibration damping device according to the present invention will employ a structure wherein the first spring projection is formed in the top plate portion of the fastening frame, and the housing main body is held in abutment pressed directly against the base plate portion. With this structure, the housing main body will be stably and fixedly supported on the fastening frame, and striking force of the independent mass member can be transmitted efficiently to the component to be damped from the hollow housing. As a result, it will be possible for the vibration damping action produced by striking of the independent mass member to act even more effectively on the component being damped.

Particularly with this structure, it will be preferable for the base plate portion to be fastened in direct abutment against the component to being damped. Furthermore, it is more effective for the base plate portion, in the zone thereof against which the housing main body is pressed, to be fastened with its outside face pressed in intimate contact directly against the component being damped. With this arrangement, even in instances where it is difficult to ensure sufficient thickness and rigidity of the press-formed fastening frame, efficient transmission of the striking force of the independent mass member to the component being damped can be advantageously ensured.

In another preferred practice, the vibration damping device according to the present invention will employ a structure wherein the first spring projection and a catching portion of the catch projection adapted to mate with housing main body are formed extending for a prescribed length in a widthwise direction of the fastening frame. With such a structure, the catch projection and the first spring projection can be readily disposed so as to abut the housing main body for a prescribed length in the direction of its width, whereby the urging force of the first spring projection and the catching force of the catch projection may be exerted more efficiently on the housing main body as compared with simple point contact. Thus, the present invention affords a higher level of stability of attachment of the housing main body and the fastening frame.

In yet another preferred practice, the vibration damping device according to the present invention will employ a structure wherein the housing main body is made of a synthetic resin material. With this arrangement, the advantages of synthetic resin materials over metal materials and the like in terms of relatively low cost, greater ease of accurate dimensioning, and lighter weight may be achieved. Even where synthetic resin materials, which typically have lower strength than metal materials, are employed in this way, owing to the design of the attachment structure to the fastening frame, the fastening frame will sufficiently ensure that the vibration damping device has the strength required of it. This feature has been found to be one technical effect which is unique to the present invention.

Preferably, the vibration damping device according to the present invention will employ a structure wherein the base plate portion of the fastening frame extends outward appreciably beyond the top plate portion towards the side opposite the back plate portion to form a fastening section having a bolt passage hole formed therein; the fastening frame is mounted onto the component to be damped through screw-fastening of a fastening bolt which has been passed through the bolt passage hole to the component to be damped; and the head of the fastening bolt which projects above the base plate portion constricts the opening for the housing main body to provide a fail-safe mechanism for preventing the housing main body from slipping out through the opening. According to this structure, with a small number of parts, the housing main body can be prevented from becoming detached from the fastening frame, thereby providing further improvement in reliability of vibration damping capability, while achieving lower cost.

The present invention in another aspect provides a method of manufacturing the aforementioned vibration damping device, comprising the steps of: accommodating the independent mass member within the accommodating space of the housing main body independently without being fastened to the housing main body; inserting the housing main body through the opening of the fastening frame and between the opposing faces of the top plate portion and the base plate portion and displacing it towards a back plate portion while inducing resilient deformation of at least one of a first spring projection and a catch projection in abutment against the housing main body, this deformation being directed towards the outside from between the opposing faces of the top plate portion and the base plate portion; positioning the inserted distal end of the housing main body in abutment against the second spring projection thereby inducing resilient deformation of the second spring projection towards the outside from between the opposing faces of the top plate portion and the base plate portion, while engaging the housing main body with the catch projection; and with the housing main body held pressed against the other of the top plate portion and the base plate portion under the urging force of the first spring projection exerted on the housing main body from one of the top plate portion and the base plate portion towards the other, and the housing main body held in a state of engagement with the catch projection under the urging force of the second spring projection exerted on the housing main body towards the opening side from the back plate portion, attaching the housing main body to the fastening frame and preventing it from becoming dislodged through the opening of the fastening frame.

As will be apparent from the preceding description of the vibration damping device as well, the method of the present invention makes it possible to obtain a vibration damping device with high dimensional accuracy and strength, at relatively low cost through a simple manufacturing process, and to thereby advantageously adapt the vibration damping device to mass production.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
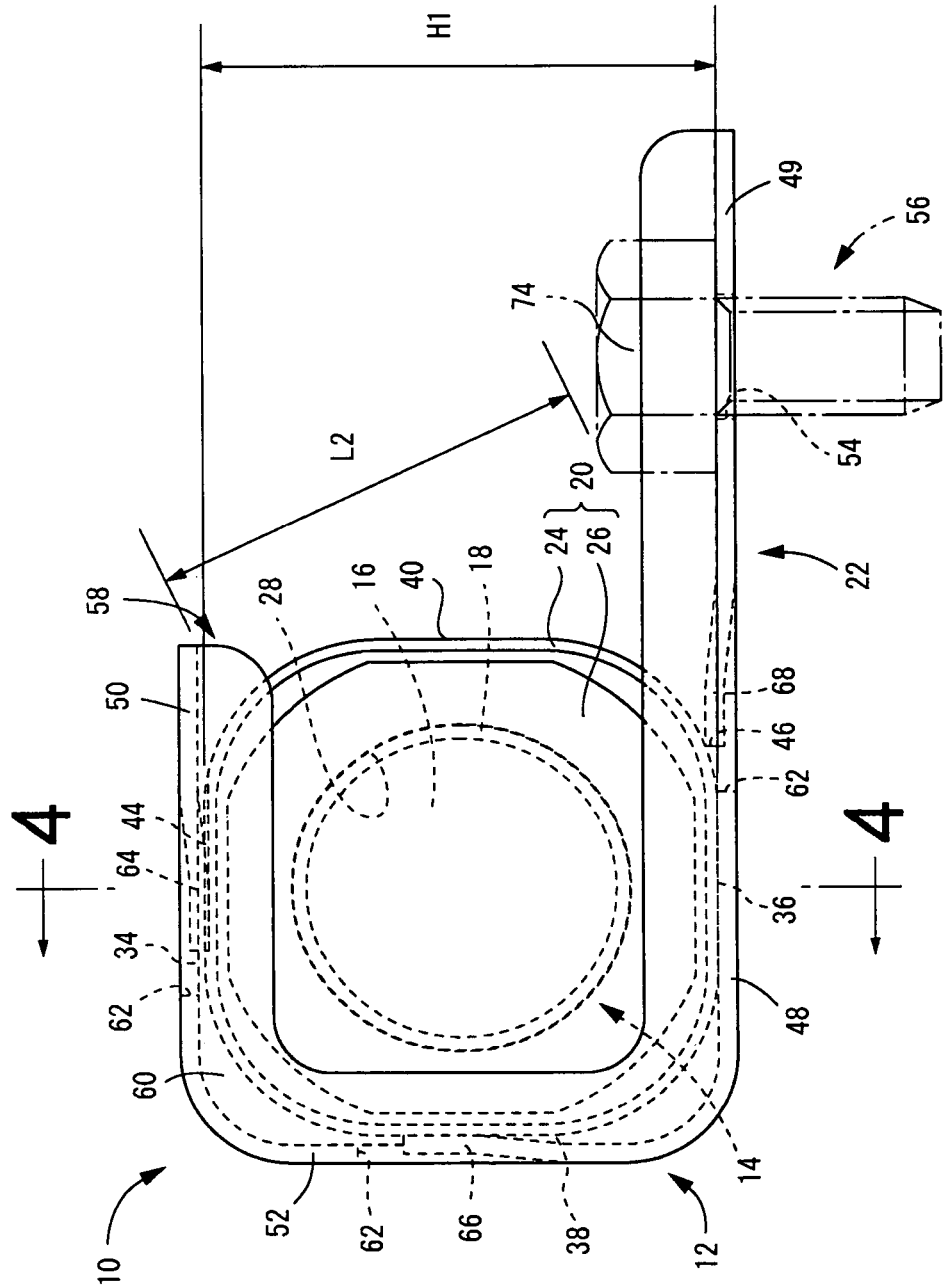
FIG. 1 is a side elevational view of an automotive vibration damping device of construction according to one preferred embodiment of the invention.
Figure 2:
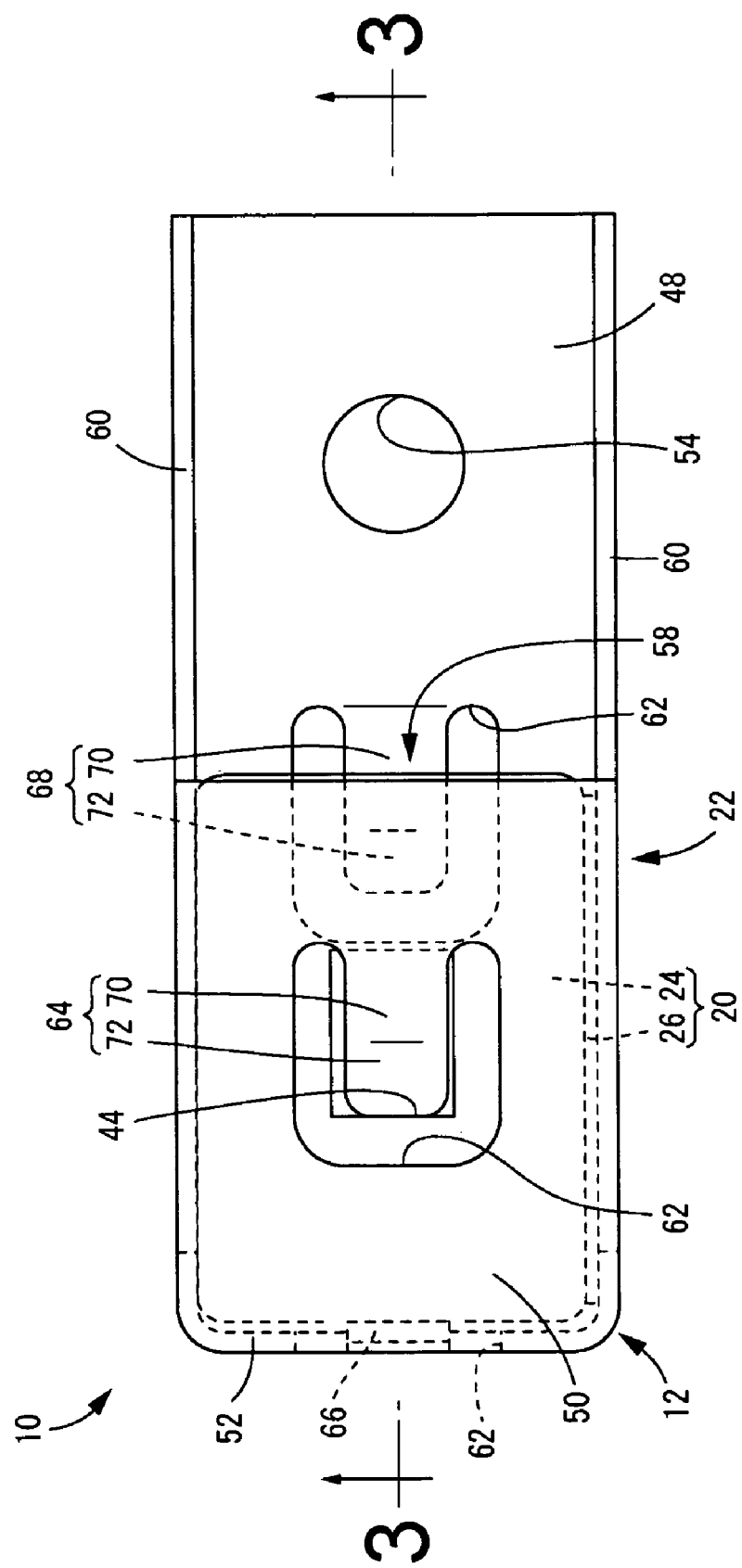
FIG. 2 is a top plane view of the automotive vibration damping device of FIG. 1.

First, FIGS. 1 and 2 depict an automotive vibration damping device 10 as a first embodiment of a vibration damping device according to the present invention. This automotive vibration damping device 10 has a structure in which an independent mass member 16 of metal is housed within an accommodating space 14 formed by a hollow housing 12. At times of vibration input, the mass member 16 will produce vibration damping action through resilient contact with the hollow housing 12.

Figure 3:
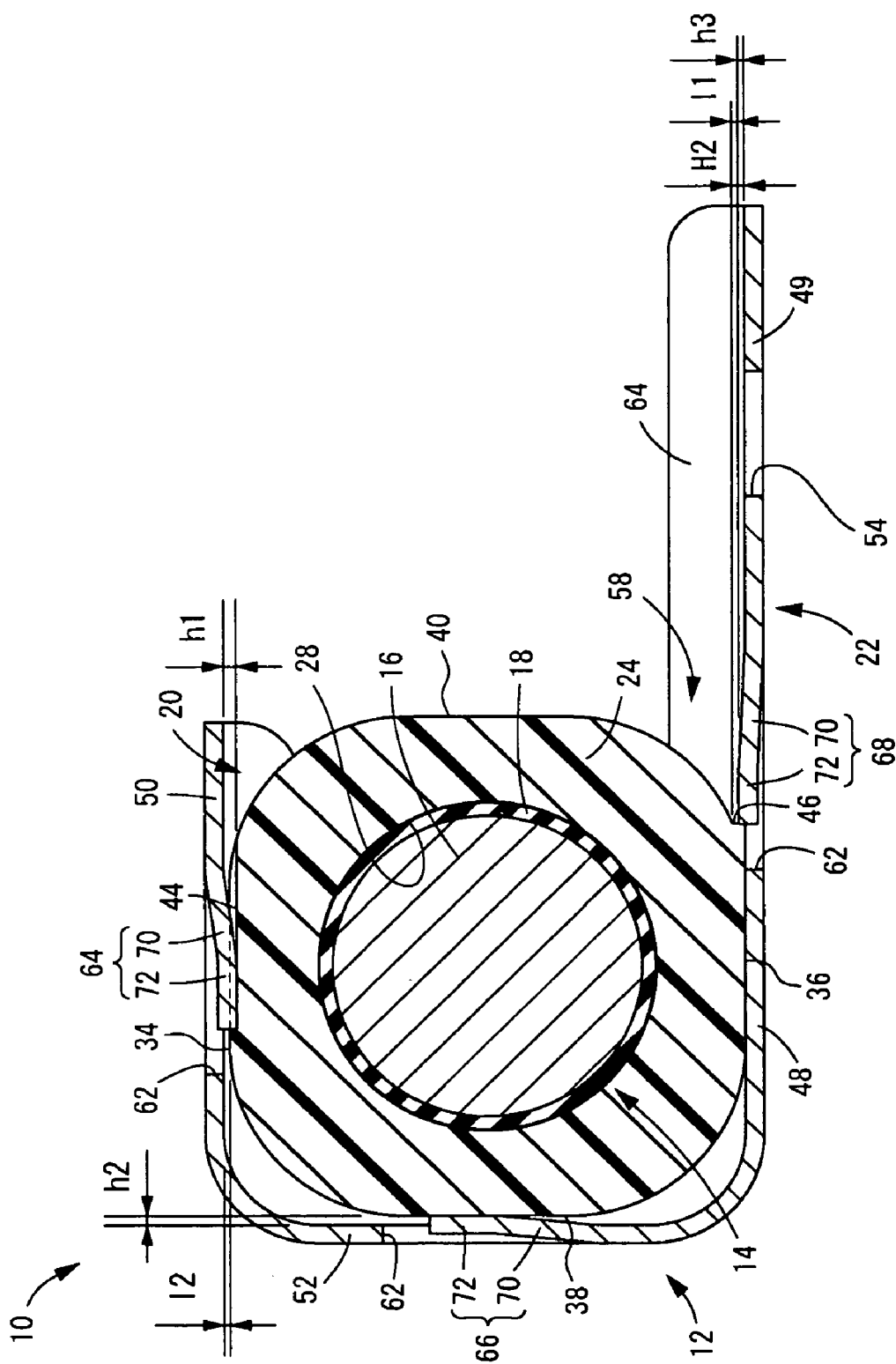
FIG. 3 is a cross sectional view taken along line 3-3 of FIG. 2.
Figure 4:
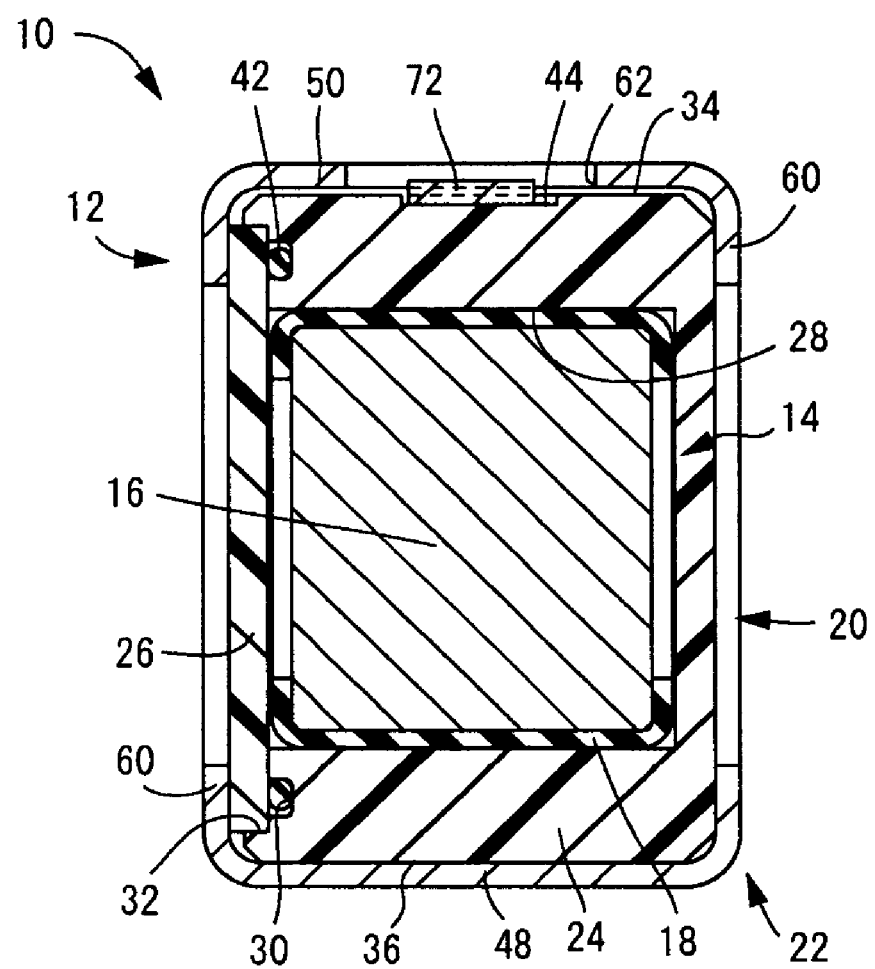
FIG. 4 is a cross sectional view taken along line 4-4 of FIG. 1.

To describe in greater detail, as shown in FIGS. 3 and 4 as well, the mass member 16 has a generally round post shape, and is formed of material having high rigidity, such as steel or aluminum alloy. In terms of achieving effective vibration damping action in particular, steel is preferred for its high specific gravity.

A contact rubber layer 18 is vulcanization bonded to the mass member 16 so as to cover the entire peripheral wall thereof and the peripheral sections at the left and right ends in the vertical width direction (sideways in FIG. 4) with a generally unchanging thickness dimension. The contact rubber layer 18 may appropriately employ, for example, natural rubber, styrene butadiene rubber, isoprene rubber, acrylonitrile butadiene rubber, chloroprene rubber, butyl rubber, and compound materials thereof. This contact rubber layer 18 will preferably have Shore D hardness (in accordance with the ASTM D2240 standard) of no more than 80, and preferably between 20 and 40, in order to effectively achieve vibration damping based on the mass member 16 striking the hollow housing 12, as well as reduced noise during striking.

The hollow housing 12 includes a housing main body 20 and a fastening frame 22. The housing main body 20 is composed of a container member 24 and a cover member 26, and may be fabricated of metal material such as steel, aluminum, or aluminum alloy for example. In the present embodiment, the housing main body 20 is made of a hard synthetic resin material. In order to achieve effective vibration damping action based on the mass member 16 with the contact rubber layer 18 striking the housing main body 20, it will be preferable to use a synthetic resin material having an elastic modulus of $5 \times 10^4$ MPa or above.

The container member 24 has a generally rectangular, bottomed tube shape provided in the center section thereof with a center recess 28 of generally circular shape which originates at a location in proximity to a first end and which opens onto the face of the other end in the vertical width direction (the vertical in FIG. 2, or sideways in FIG. 4). A circumferential groove 30 is formed about a rim of the opening of the center recess 28 of the container member 24 and extends continuously about the entire circumference. Around the circumferential groove 30 on this other end face of the container member 24, the generally rectangular or circular tubular section projects outward in the vertical width direction thereby forming on the other end face of the container member 24 a mating recess 32 which is larger than the center recess 28 and the circumferential groove 30.

In the present embodiment in particular, the four corners of the rectangular tube-shaped container member 24 are curved along the circumferential direction of the circumferential wall portion so that an upper end face 34 and a lower end face 36 which are situated in opposition in the height direction (the vertical in FIGS. 1, 3, and 4) of the container member 24 are respectively connected smoothly via curving faces with a first lateral end face 38 and with another lateral end face 40 situated in opposition in the lateral width direction (sideways in FIGS. 1-3).

The cover member 26 has a flat shape whose contour correspond to the outside contour of the mating recess 32 of the container member 24, and is inserted fitting into the mating recess 32 and juxtaposed against the bottom face of the mating recess 32. In other words, against the edge faces around the rim of the opening of the center recess 28 and of the circumferential groove 30 in the container member 24, then fastened to the container member 24 with an adhesive, by welding, or the like. The center recess 28 and the circumferential groove 30 are thereby covered by the cover member 26, completing the housing main body 20. A large-diameter ring-shaped O-ring 42 of elastomer material is fitted within the circumferential groove 30 of the container member 24, and functions to enhance the fluid-tightness of the center recess 28 on the basis of compressive deformation to fill the annular zone created when the circumferential groove 30 is covered with the cover member 26.

By so doing, there is created in the interior of the housing main body 20, in a zone thereof defined by the center recess 28 of the container member 24 and the cover member 26, the accommodating space 14 which extends with unchanging circular cross section in the vertical width direction (sideways in FIG. 4). The mass member 16 furnished with the contact rubber layer 18 is arranged housed within this accommodating space 14 in an independent, unjoined state. Specifically, with the mass member 16 positioned on the same center axis with the accommodating space 14 of the housing main body 20, a small gap will form throughout between the outside peripheral face of the contact rubber layer 18 and the peripheral wall face of the center recess 28 which defines the peripheral wall of the accommodating space 14. Moreover, with the center section of the mass member 16 in its vertical width direction positioned in the center section of the accommodating space 14, small gaps will form respectively between the end faces of the contact rubber layer 18 which covers the vertical widthwise ends of the mass member 16, and the bottom face of the center recess 28 and the end face of the cover member 26 which define the two ends of the accommodating space 14.

A catch recess 44 is formed in the center section of the upper end face 34 of the housing main body 20 (the container member 24). The catch recess 44 has a generally rectangular shape in plan view which extends in a straight line from the center section of the upper end face 34 towards the other side of the housing main body 20 in the lateral width direction (rightward in FIGS. 1 to 3) and which opens onto a curving face, as well as extending for a prescribed length in the vertical width direction (the vertical in FIG. 2). The center section of the upper end face 34 thereby has a cutout contour defined by the catch recess 44, with the bottom face of the catch recess 44 situated below the upper end face 34, and with the wall faces at either side of the catch recess 44 in the vertical width direction rising up from the bottom face to meet the upper end face 34. The wall facing to one side in the lateral width direction of the catch recess 44 (the left side in FIGS. 1 to 3) has a generally rectangular shape extending longitudinally in the vertical width direction and uprising from the bottom face to meet the upper end face 34.

Furthermore, a raised catch portion 46 is integrally formed on the lower end face 36 of the housing main body 20 (container member 24), in a section thereof which connects with the curving face to the other side in the lateral width direction (right in FIGS. 1 to 3). The raised catch portion 46 extends with generally unchanging rectangular cross section in the vertical width direction through the center section of the lower end face 36 in the vertical width direction (the vertical in FIG. 2 or sideways in FIG. 4), with the lower edge face of the raised catch portion 46 connecting smoothly to the lower end face of the housing main body 20 at the same heightwise position therewith, and with the wall face of the raised catch portion 46 facing towards the other side in the lateral width direction (rightward in FIGS. 1 to 3) having a generally rectangular shape extending longitudinally in the vertical width direction and uprising from the lower edge face of the raised catch portion 46 to meet the curved face of the housing main body 20 to the other side in the lateral width direction.

Meanwhile, the fastening frame 22 is a press formed component formed by press working of a sheet of metal having a flat shape of generally unchanging thickness dimension throughout. As the metal sheet it will be preferable to employ a material with high rigidity such as steel or aluminum alloy, and also having a prescribed level of elasticity. The section of the fastening frame 22 situated to one side (the left side in FIGS. 1 to 3) of the generally center section of the fastening frame in the lateral width direction is bent over into an approximate "U" shape through press working to produce a base plate portion 48, a top plate portion 50, and a back plate portion 52 of the fastening frame 22.

The base plate portion 48 has a generally flat rectangular shape extending longitudinally in the lateral width direction. A bolt passage hole 54 is bored through the base plate portion 48 in generally center section thereof in the vertical width direction (the vertical in FIG. 2) which is eccentric towards the other side on the lateral width direction (rightward in FIGS. 1 to 3) from the center section.

The top plate portion 50 has a generally flat rectangular shape of vertical width dimension approximately equal to that of the base plate portion 48 and lateral width dimension approximately one-half that of the base plate portion 48. The top plate portion 50 extends approximately parallel to the base plate portion 48, and is situated in opposition across a prescribed distance in the height direction (the vertical in FIGS. 1 and 3) from a section to one side (the left side in FIGS. 1 to 3) from the center section of the base plate portion 48 in the lateral width direction.

The back plate portion 52 has a generally flat rectangular shape of vertical width dimension approximately equal to that of the base plate portion 48 and the top plate portion 50. It extends between the respective ends of base plate portion 48 and the top plate portion 50 to one side thereof in the lateral width direction (the left side in FIGS. 1 to 3), in a generally straight line in the direction of opposition of the two plate portions 48, 50 so as to connect with their two ends. The connecting sections of the back plate portion 52 with the base plate portion 48 and the top plate portion 50 are curving in the lateral width direction.

As a result, the base plate portion 48 of the fastening frame 22 extends further outward in the lateral width direction beyond the top plate portion 50 towards the opposite side from the back plate portion 52 in the lateral width direction (the right side in FIGS. 1 to 3), with the aforementioned bolt passage hole 54 being formed in this extended section which constitutes a fastening section 49 to the component being damped, thereby allowing a fastening bolt 56 passed through the bolt passage hole 54 to be attached to the component being damped (here, a problematic vibrating component on the vehicle body side, not shown). Between the base plate portion 48 and the top plate portion 50 at the ends thereof to the opposite side in the lateral width direction from the back plate portion 52, there is formed an opening 58 for insertion of the housing main body 20.

Additionally, at the two edges of the fastening frame 22 in the vertical width direction, a pair of side plate portions 60, 60 are formed by a press working process. The side plate portions 60 are of flat rectangular shape projecting upward from the edges of the base plate portion 48 and projecting downward from the edges of the top plate portion 50, as well as projecting toward the other side in the lateral width direction (the right side in FIGS. 1-3) from the edges of the back plate portion 52. The side plate portions 60 extend with generally unchanging height dimension continuously along the base plate portion 48, the back plate portion 52, and the top plate portion 50 in their entirety so as to project towards the inside of the fastening frame 22.

Cutout holes 62 are made in the base plate portion 48, the top plate portion 50, and the back plate portion 52, in their respectively center sections in the vertical width direction (the vertical in FIG. 2 or sideways in FIG. 4). In particular, the cutout holes 62 made in the base plate portion 48 and in the top plate portion 50 have a generally "C" shape opening in the lateral width direction (the right side in FIGS. 1 to 3) in plan and bottom view and are situated in approximately center section of the plate portions 48, 50 in the lateral width direction. The cutout hole 62 that is formed in the back plate portion 52 has an upward opening "U" shape in front and rear view and is situated in approximately center section of the back plate portion 52 in the height direction.

Additionally, a first spring projection 64 and a second spring projection 66 are formed to the inside of the cutout hole 62 of the top plate portion 50 and to the inside of the cutout hole 62 of the back plate portion 52, while a catch projection 68 is formed to the inside of the cutout hole 62 of the base plate portion 48. In particular, each of the projections 64, 66, 68 according to the present embodiment includes a sloping portion 70 and a flat portion 72, and is bent to project towards the inside of the fastening frame 22. The cutout holes 62 and the projections 64, 66, 68 provided with the sloping portion 70 and a flat portion 72 will preferably be produced through press working, for example. The inside of the fastening frame 22 refers to a zone defined by the top plate portion 50, the base plate portion 48, the back plate portion 52, and the pair of side plate portions 60, 60.

The sloping portion 70 of the first spring projection 64 and the sloping portion 70 of the catch projection 68 gradually increase in their projecting dimension towards the base plate portion 48 or towards the top plate portion 50 going from the basal end section integrally formed with the top plate portion 50 or with the base plate portion 48 at the other side in the lateral width direction (the right side in FIGS. 1 to 3), giving them a generally flat rectangular shape inclined at a prescribed angle with respect to the base plate portion 48 or the top plate portion 50. The sloping portion 70 of the second spring projection 66 gradually increases in its projecting dimension towards the opening 58 of the fastening frame 22 going from the basal end section which is integrally formed with the back plate portion 52 at the lower side in the height direction, thereby giving it a generally flat rectangular shape inclined at a prescribed angle with respect to the back plate portion 52. In the present embodiment, the sloping portion 70 of the first spring projection 64 and the sloping portion 70 of the second spring projection 66 have approximately identical slope, which is greater than the slope of the sloping portion 70 of the catch projection 68.

The respective flat portions 72 of the first spring projection 64, the second spring projection 66, and the catch projection 68 begin at the projecting distal end portion of the respective sloping portion and extend in a straight line for a length short of the peripheral edge of the respective cutout hole 62; and have generally flat rectangular shape extending generally parallel to the top plate portion 50, the back plate portion 52, and the base plate portion 48, respectively. Through this design, the distal end section of the flat portion 72 of the first spring projection 64 situated facing the back plate portion 52 constitutes a rectangular catch portion that extends longitudinally in the vertical width direction (the vertical in FIG. 2). The distal end section of the flat portion 72 of the second spring projection 66 situated facing the top plate portion 50 has a rectangular shape extending longitudinally in the vertical width direction. Also, the distal end section of the flat portion 72 of the catch projection 68 situated facing the back plate portion 52 has a rectangular shape extending longitudinally in the vertical width direction, and serves as a catch portion of the catch projection 68.

In particular, the distal end section (catch portion) of the flat portion 72 of the catch projection 68 situated facing the back plate portion 52 will be positioned in proximity to the opening 58 of the fastening frame 22, between the top plate portion 50 and the base plate portion 48 inward from the opening 58. In other words, the distance separating the catch portion of the catch projection 68 and the back plate portion 52 is smaller than the distance separating the opening 58 of the fastening frame 22 and the back plate portion 52.

Figure 5:
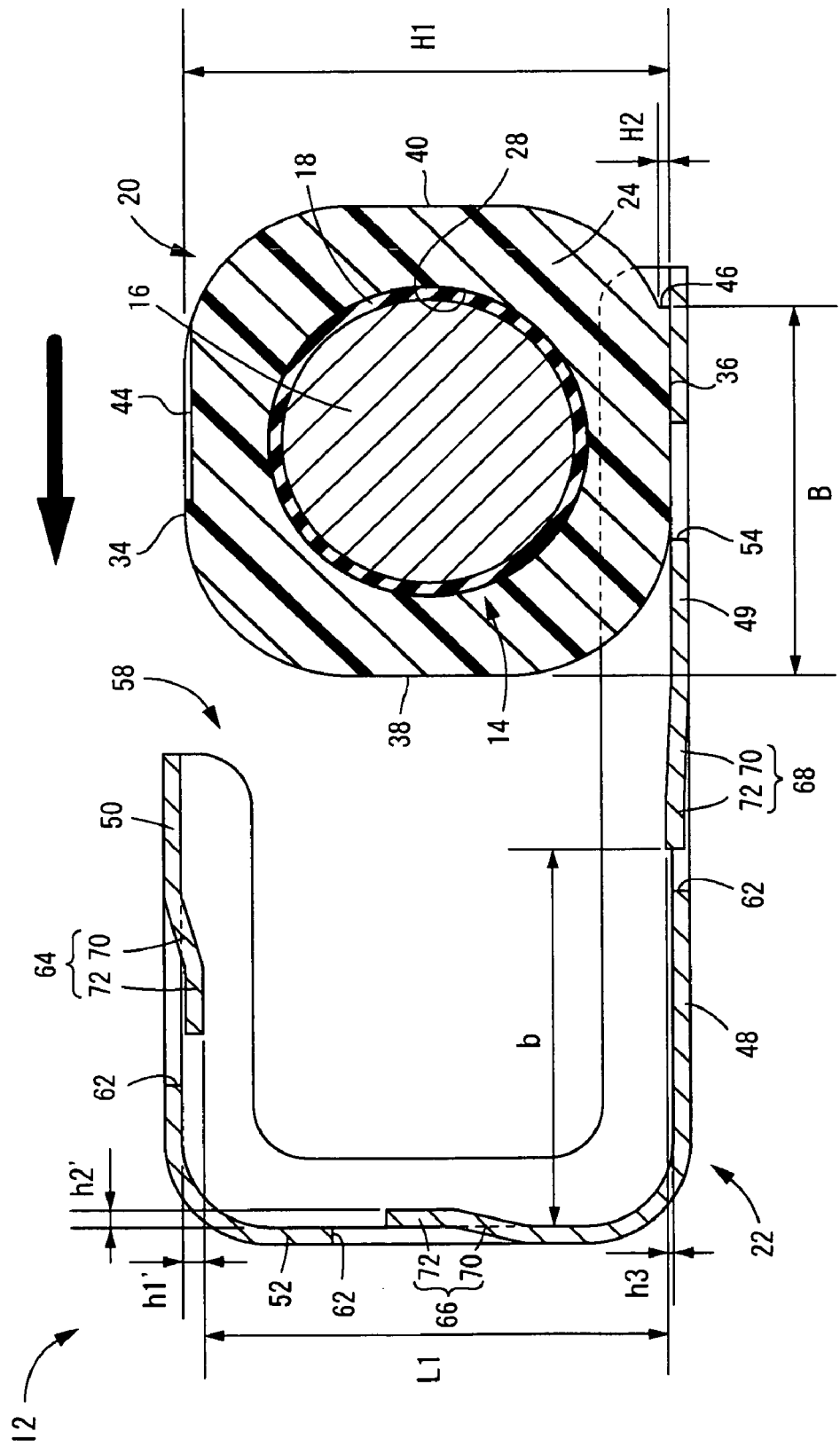
FIG. 5 is a vertical cross sectional view illustrating one step of manufacturing the automotive vibration damping device of FIG. 1.

As shown in FIG. 5, in the present embodiment, even in the state prior to assembly of the housing main body 20 and the fastening frame 22, the sloping portions 70 will be inclined with respect to the plate portions, i.e. the top plate portion 50, the back plate portion 52, and the base plate portion 48; and the flat portions 72 will extend parallel to the plate portions 48, 50, 52.

In the state prior to assembly of the housing main body 20 and the fastening frame 22, the projecting height dimension: h1' of the first spring projection 64 towards the base plate portion 48 from the top plate portion 50 is substantially identical to the projecting height dimension: h2' of the second spring projection 66 towards the opening 58 from the back plate portion 52, and these are greater than the projecting height dimension: h3' of the catch projection 68 towards the top plate portion 50 from the base plate portion 48.

Moreover, the height dimension: H1 from the upper end face 34 to the lower end face 36 of the housing main body 20 is slightly smaller than the distance between the opposing faces of the top plate portion 50 and the base plate portion 48 of the fastening frame 22, in other words, the height dimension of the opening 58 of the fastening frame 22; and is greater than the distance: L1 equivalent to the distance between the opposing face of the top plate portion 50 and the base plate portion 48 net of the height dimension: h1' of the first spring projection 64 and the height dimension: h3 of the catch projection 68. The height dimension: h3' of the catch projection 68 of the fastening frame 22 is smaller than the height dimension: H2 of the raised catch portion 46 of the housing main body 20, so that h3<H2.

Furthermore, the dimension from the outside end face of the cover portion 26 to the outside end face of the base portion of the container member 24 in the housing main body 20 in the vertical width direction (the vertical in FIG. 2) is slightly smaller than the distance separating the pair of side plate portions 60, 60 positioned in opposition in the vertical width direction of the fastening frame 22.

Moreover, the lateral width dimension from the first lateral end face 38 to the other lateral end face 40 of the housing main body 20 is smaller than the distance separating the back plate portion 52 and the opening 58 which are positioned in opposition in the lateral width direction of the fastening frame 22 (sideways in FIGS. 1 to 3). In the present embodiment in particular, the relationship among the lateral width dimension: B from the first lateral end face 38 to the lateral widthwise end face of the raised catch portion 46 in the housing main body 20, the lateral width dimension: b from the inside peripheral face of the back plate portion 52 to the lateral widthwise distal end face of the catch projection 68 (the distance separating the catch portion of the catch projection 68 and the back plate portion 52) in the fastening frame 22, and the projecting height dimension: h2' of the second spring projection 66 from the back plate portion 52 towards the opening 58 is such that b−h2'<B<b.

A specific example of the method of making the vibration damping device 10 during assembly of the housing main body 20 to the fastening frame 22 will be described below, but the present invention is not limited to this specific example.

First, the mass member 16 with the contact rubber layer 18 anchored thereto is placed within the center recess 28 of the container member 24, and the center recess 28 is then covered with the cover member 26, thereby housing the mass member 16 within the accommodating space 14 formed in the interior of the housing main body 20 so as to leave a small gap.

Next, the housing main body 20 is inserted from its first lateral end face 38 into the opening 58 of the fastening frame 22, and is displaced between the opposing faces of the top plate portion 50 and the base plate portion 48, from the opening 58 towards the back plate portion 52. Since the height dimension: H1 of the housing main body 20 is greater than the distance: L1 equivalent to the distance between the opposing face of the top plate portion 50 and the base plate portion 48 net of the height dimension: h1' of the first spring projection 64 and the height dimension: h2' of the second spring projection 66, the upper end face 34 of the housing main body 20 will come into contact against the first spring projection 64 while the lower end face 36 of the housing main body 20 will come into contact against the catch projection 68, so that the housing main body 20 is engaged from either side in the height direction by the first spring projection 64 and the catch projection 68. However, by inducing displacement of the housing main body 20 towards the back plate portion 52 at a level of force greater than this engaging force, the first spring projection 64 and the catch projection 68 will experience elastic deformation towards the outside of the fastening frame 22, making it possible to induce displacement of the housing main body 20 while the housing main body 20 is subjected from both sides in the height direction to urging force based on elastic recovery force of the projections 64, 68 attempting to return to their original shape. In the present embodiment in particular, since the corners of the housing main body 20 have a curving shape on the side thereof intended for insertion into the fastening frame 22 from the opening 58, and moreover since sloping portions 70 have been formed in the first spring projection 64 and the catch projection 68 at the basal end sides thereof facing towards the opening 58, when the housing main body 20 comes into contact from its corners against the projections 64, 68, at their basal end side, this contact will take place smoothly.

Additionally, by positioning the lateral end face 38 at the front end of the housing main body 20 in the direction of insertion (the left side in FIGS. 1 to 3) in contact against the second spring projection 66 and then inducing further displacement of the housing main body 20 towards the back plate portion 52 side, the second spring projection 66 will be induced to undergo elastic deformation towards the outside of the fastening frame 22.

Then, as shown in FIG. 3, when the height dimension of the second spring projection 66 is reduced from h2' to h2, the first spring projection 64 will become mated within the catch recess 44 of the housing main body 20, and the distal end section (face) of the flat portion 72 of the first spring projection 64 which faces the back plate portion 52 will become juxtaposed against and engage the end face of the catch recess 44 which faces the opening 58, while the catch projection 68 of the fastening frame 22 will be released from its state of elastic deformation so that the distal end section (face) of the flat portion 72 of the catch projection 68 which faces the back plate portion 52 becomes juxtaposed against and engages the end face of the raised catch portion 46 of the housing main body 20 which faces the opening 58. The engaging force of the first spring projection 64 with the catch recess 44, and the engaging force of the catch projection 68 with the raised catch portion 46, are the result of urging force directed on the housing main body 20 from the back plate portion 52 towards the opening 58 side due to elastic recovery force of the second spring projection 66 attempting to return to its original shape. Since the relationship among the lateral width dimension: B from the first lateral end face 38 to the lateral widthwise end face of the raised catch portion 46 in the housing main body 20, the lateral width dimension: b from the inside peripheral face of the back plate portion 52 to the lateral widthwise distal end face of the catch projection 68 in the fastening frame 22, and the projecting height dimension: h2' of the second spring projection 66 from the back plate portion 52 towards the opening 58 is such that b−h2'<B<b, the housing main body 20 will reliably be subjected to urging force resulting from elastic recovery force equivalent to deformation of the second spring projection 66 by h2'−h2, and directed towards the opening 58 from the back plate portion 52.

In this engaged state, the height dimension: h3 of the catch projection 68 of the fastening frame 22 is approximately the same as that in the condition prior to assembly of the housing main body 20, with the height dimension: h3 being smaller than the height dimension: H2 of the raised catch portion 46 of the housing main body 20, and with the housing main body 20 and the catch projection 68 positioned apart by a prescribed distance: l1 in the height direction. Thereby, the catch projection 68 will experience substantially no elastic deformation, or even if a certain amount of elastic deformation is assumed, the urging force resulting from elastic recovery force of the catch projection 68 will not be exerted towards the top plate portion 50 from the base plate portion 48.

Meanwhile, the first spring projection 64 will experience compressive deformation in the height direction between the top plate portion 50 and the base plate portion 48 of the fastening frame 22, reducing the height dimension of the first spring projection 64 from h1' to h1. The housing main body 20 will thereby be subjected to urging force resulting from elastic recovery force equivalent to deformation of the first spring projection 64 by h1'−h1, and directed towards the base plate portion 48 from the top plate portion 50.

Consequently, due to the fact that the height dimension: h3 of the catch projection 68 of the fastening frame 22 is smaller than the height dimension: H2 of the raised catch portion 46 of the housing main body 20 and the housing main body 20 is not subjected to urging force directed from the base plate portion 48 towards the top plate portion 50, and the fact that urging force of the first spring projection 64 is directed onto the housing main body 20 from the top plate portion 50 towards the base plate portion 48, the housing main body 20 will be pushed from the top plate portion 50 towards the base plate portion 48, and become juxtaposed with the lower end face 36 of the housing main body 20 and the inside peripheral face of the base plate portion 48 in intimate contact. By making the height dimension: H1 of the housing main body 20 slightly smaller than the distance between the opposing faces of the top plate portion 50 and the base plate portion 48 of the fastening frame 22, with the lower end face 36 and the inside peripheral face of the base plate portion 48 in intimate contact, the upper end face 34 of the housing main body 20 and the inside peripheral face of the top plate portion 50 of the fastening frame 22 will be positioned apart by a prescribed distance: l2 in the height direction.

Specifically, the housing main body 20 will be retained pressed against the base plate portion 48 from the top plate portion 50 of the fastening frame 22 due to the urging force of the first spring projection 64, while the housing main body 20 is also retained engaged by the first spring projection 64 and the catch projection 68 of the fastening frame 22, due to the urging force of the second spring projection 66. As a result, the housing main body 20 will now be securely attached between the opposing faces of the top plate portion 50 and the base plate portion 48 of the fastening frame 22, and prevented from becoming dislodged through the opening 58 of the fastening frame 22.

In the present embodiment in particular, the flat portion 72 of the first spring projection 64 is juxtaposed against the flat bottom face of the catch recess 44 of the housing main body 20, while the flat portion 72 of the second spring projection 66 is juxtaposed against the flat lateral end face 38 of the housing main body 20, thus providing the juxtaposed sections of the first and second spring projections 64, 66 against the housing main body 20 with a large surface area. Moreover, the first spring projection 64 is juxtaposed against the approximately center section of the upper end face 34 of the housing main body 20, while the second spring projection 66 is juxtaposed against the approximately center section of the lateral end face 38 of the housing main body 20

The hollow housing 12 is composed of the assembly of the housing main body 20 with the fastening frame 22; and the automotive vibration damping device 10 according to the embodiment includes this hollow housing 12, together with the mass member 16 which is housed in the housing main body 20 making up part of the hollow housing 12.

The automotive vibration damping device 10 having the above structure is fixedly installed by juxtaposing the base plate portion 48 of the fastening frame 22, and then passing the fastening bolt 56 through the bolt passage hole 54 in the base plate portion 48, and screw-fastening it to the vibrating component on the vehicle body side.

In the present embodiment in particular, the head 74 of the fastening bolt 56 which projects up from the base plate portion 48 is positioned a prescribed distance away to the outside in the lateral width direction (to the right in FIGS. 1 to 3) from the opening 58 of the fastening frame 22. The width dimension of the head 74 is a dimension that will not be sufficiently small with respect to the vertical width dimension of the opening 58 of the fastening frame 22, while the minimum separation distance: L2 between the head 74 and the upper edge of the opening 58 is smaller than the height dimension: H1 of the housing main body 20. As a result, with the head 74 of the fastening bolt 56 disposed in proximity to the opening 58, the opening 58 will be substantially constricted and if conditions are such that, for example, the housing main body 20 becomes disengaged from the first spring projection 64 or the catch projection 68 and the housing main body 20 becomes displaced outwardly towards the fastening frame 22, this displacement will be impeded and restricted by the head 74. That is, in the present embodiment, the head 74 of the fastening bolt 56 constitutes a fail-safe mechanism for preventing the housing main body 20 from slipping out through the opening 58.

In the installed state, when vibration of the vibrating component on the vehicle body side is input to the hollow housing 12, the mass member 16 will undergo relative displacement so as to bounce independently with respect to the hollow housing 12 in the direction of vibration input, and will strike against the container member 24 and the cover member 26 via the contact rubber layer 18. As a result, the vibration damping action will be produced on the basis of energy loss and sliding friction due to the striking action of the mass member 16 against the hollow housing 12. In the present embodiment in particular, since the base plate portion 48, which makes up part of the zone in which the housing main body 20 is secured between the top plate portion 50 and the base plate portion 48 of the fastening frame 22 is juxtaposed directly against the vibrating component, the vibration damping effect produced by the striking action of the mass member 16 will be directed efficiently to the vibrating component, affording further improvement in vibration damping effect.

The hollow housing 12 of the automotive vibration damping device 10 according to the embodiment includes a fastening frame 22 and a housing main body 20 of mutually independent construction, making it possible to modify their respective designs independently. Consequently, in the fastening frame 22, there is no need for a high degree of accuracy in designing the accommodating space 14 for the mass member 16, and it will be possible to select metal materials having strength sufficient to prevent a decline in durability due to high stress in sections fastened to the vibrating component. Additionally, for the housing main body 20, it is not necessary to select a high strength material in order to provide the required strength in sections fastened to the vibrating component, and it may be formed of a synthetic resin material as shown above by way of example, so the accommodating space 14 of the housing main body 20 can be dimensioned with a high degree of accuracy.

Moreover, since the urging force of the first spring projection 64 and the second spring projection 66, and the engaging structure of the catch projection 68 and the first spring projection 64 are utilized to attach the housing main body 20 to the fastening frame 22, the assembly operation will be simpler than where assembly is carried out through a swaging process, or using fastening bolts.

Furthermore, since there is no need to form a special swaged portion, bolt passage hole, or the like in the housing main body 20, stress will be reduced in the section fastened to the fastening frame 22, and strength will be advantageously assured. It will be possible thereby to further increase the relative importance of a dimensionally accurate design to a strong design of the housing main body 20, and to afford further improved dimensional accuracy.

Moreover, the first spring projection 64, the second spring projection 66, and the catch projection 68 are disposed on the fastening frame 22 side, thus eliminating the risk of burrs or surface sinkage forming in association with forming of the projections on the housing main body 20. With this arrangement, the intended part accuracy of housing main body 20 may be consistently achieved, and the labor associated with secondary machining processes of the housing main body 20 can be minimized, thus advantageously assuring strength while improving production efficiency.

Additionally, in the present embodiment, the corners of the housing main body 20 on the side thereof intended for insertion through the opening 58 of the fastening frame 22 have curving contours, while the first spring projection 64 and the catch projection 68 have the sloping portion 70 formed at their basal end section which faces towards the opening 58, thereby affording smooth contact when the housing main body 20 comes into contact from its corner side against the basal end sides of the projections 64, 68. Thus, resistance will be lower when the housing main body 20 is displaced towards the back plate portion 52 of the fastening frame 22, further facilitating the assembly procedure, as well as reducing the likelihood of damage in the contacting sections, and affording improved durability of the fastening frame 22 and the housing main body 20.

Furthermore, by positioning the first spring projection 64 towards the back plate portion 52 side of the catch projection 68, and situating the first spring projection 64 and the catch projection 68 at locations away from one another when viewed in projection in the height direction, the urging force of the first spring projection 64 directed towards the base plate portion 48 from the top plate portion 50 will be exerted more consistently on the housing main body 20, thereby more advantageously ensuring a state of intimate contact between the lower end face 36 of the housing main body 20 and the base plate portion 48 of the fastening frame 22, as well as affording more consistent engaging action of the housing main body 20 by the catch projection 68, and more advantageously preventing the housing main body 20 from slipping out through the opening 58 of the fastening frame 22.

Moreover, in the present embodiment, the first spring projection 64 and the second spring projection 66 are respectively provided with a flat portion 72, and the flat portion 72 of each of the projections 64, 66 is juxtaposed against a flat section of the housing main body 20, thus providing a sizeable juxtaposed section so that the urging force of the first and second spring projections 64, 66 is exerted stably on the housing main body 20.

Additionally, in the present embodiment, the first spring projection 64 is juxtaposed against the approximate center section the upper end face 34 of the housing main body 20, while the second spring projection 66 is juxtaposed against the approximate center section the lateral end face 38 of the housing main body 20 so that the urging force of the projections 64, 66 passes approximately through the center of gravity of the housing main body 20. This eliminates the risk that, for example in the event that urging force diverges appreciably from the center of gravity and the housing main body 20 is subjected to forces tending to induce displacement in an irregular direction, excessive stress will be produced in the catch projection 68, in the catch portion of the raised catch portion 46, or in the juxtaposed sections of the housing main body 20 and the fastening frame 22, thereby affording improved durability of the hollow housing 12.

For this reason, with the vibration damping device 10 of construction according to the present embodiment, the two functions of strength on the one hand and dimensional accuracy required of the hollow housing 12 on the other may be separated from one another, and on the basis of technical ideas directed to meeting each of these requirements at a high level, it will be possible on the housing main body 20 end to achieve the desired dimensional accuracy while on the fastening frame 22 end to ensure the desired strength. Moreover, owing to the simple and stable attachment structure of the fastening frame 22 and the housing main body 20, it will be possible to advantageously achieve a vibration damping device 10 that meets both of these requirements with relatively low cost.

While the present invention has been described in detail in its presently preferred embodiment, for illustrative purpose only, it is to be understood that the invention is by no means limited to the details of the illustrated embodiment, but may be otherwise embodied with various changes, modifications and improvements which may occur to those skilled in the art, without departing from the spirit and scope of the invention.

For instance, in the preceding embodiment, with the housing main body 20 and the fastening frame 22 in the assembled state and in the state prior to assembly, the sloping portions 70 are inclined with respect to the plate portions, i.e. the top plate portion 50, the back plate portion 52, and the base plate portion 48 while the flat portions 72 extend parallel to the plate portions 48, 50, 52. It would be acceptable instead, in either the stage prior to assembly or in the assembled state, for some or all of the sloping portions 70 to extend parallel to the plate portions 48, 50, 52, or for some or all of the sloping portions 70 to extend on an incline with respect to the plate portions 48, 50, 52, for example.

Moreover, while in the preceding embodiment, the first spring projection 64, the second spring projection 66, and the catch projection 68 each include a sloping portion 70 and a flat portion 72, it would be possible to omit the flat portion 72, instead having each projection sloping in its entirety.

Furthermore, in the preceding embodiment the first spring projection 64, the second spring projection 66, and the catch projection 68 are single projections respectively formed in the center section of the top plate portion 50, the back plate portion 52, and the base plate portion 48. It would be acceptable instead to form them at a location eccentric from the center section, or to form multiple projections spaced apart in the vertical width direction or lateral width direction.

In the preceding embodiment moreover, the first spring projection 64 is formed in the top plate portion 50 of the fastening frame 22, the catch projection 68 is formed on the base plate portion 48 of the fastening frame 22, and the lower end face 36 of the housing main body 20 is pressed under the urging force of the first spring projection 64 from the top plate portion 50 towards the base plate portion 48 and into intimate contact against the inside peripheral face of the base plate portion 48. However, it would be acceptable instead, for example, to form the first spring projection 64 on the base plate portion 48, to form the catch projection 68 on the top plate portion 50, and to press the upper end face 34 of the housing main body 20 under the urging force of the first spring projection 64 from the base plate portion 48 towards the top plate portion 50 and into intimate contact against the inside peripheral face of the top plate portion 50, with the lower end face 36 of the housing main body 20 and the inside peripheral face of the base plate portion 48 spaced apart from each other. In this case, the primary vibration damping action based on striking of the mass member 16 against the housing main body 20 will be directed onto the component to be damped, from the top plate portion 50 through the back plate portion 52 and the base plate portion 48 of the fastening frame 22.

Additionally, in the preceding embodiment cutout holes 62 are made in the top plate portion 50, the back plate portion 52, and the base plate portion 48, with the sloping portion 70 and flat portion 72 situated to the inside of the cutout hole 62 projecting towards the inside of the fastening frame 22 so that the first spring projection 64, the second spring projection 66, and the catch projection 68 assume an upraised condition. It would also be acceptable, for example, to omit the cutout holes 62 and instead perform a localized cutting process on the top plate portion 50, the back plate portion 52, and the base plate portion 48, then perform a bending process in the uncut sections, causing the cut sections to project into the fastening frame 22.

That is, the shape, size, structure, number, placement, and so on of the first spring projection 64, the second spring projection 66, and the catch projection 68 may be modified in design appropriately according to the required fastening force of the housing main body 20, manufacturability, and other considerations, and are not limited to those shown herein by way of example.

Additionally, while in the preceding embodiment, the base plate portion 48 which constitutes part of the zone in which the housing main body 20 is fastened between the opposing faces of the top plate portion 50 and the base plate portion 48 of the fastening frame 22 is juxtaposed directly against a vibrating component on the vehicle body side as the component to be damped, by instead fastening the fastening frame 22 to the vibrating component at a section of the base plate portion 48 situated away from the accommodating space for the housing main body 20, the section of the base plate portion 48 extending from the fastening region to the accommodating space for the housing main body 20 can be utilized as a spring element for the vibration damping device. As a result, in addition to the secondary vibrating system of the preceding embodiment which includes the hollow housing 12 and the mass member 16, there will be constituted another secondary vibrating system composed of a mass-spring system wherein the mass member 16, the housing main body 20 housing the mass member 16, and the section of the fastening frame 22 which houses the housing main body 20 together constitute a mass element and the section of the base plate portion 48 extending from the location of fastening on the vehicle body side to the accommodating space for the housing main body 20 constitutes a spring element, thus making it possible to achieve vibration damping action over a wider range of vibration frequencies.

Moreover, in the preceding embodiment, the accommodating space 14 is formed with a closed design by covering the center recess 28 of the container member 24 of the housing main body 20 with the cover member 26, but it would be possible to omit the cover member 26 and instead leave the accommodating space 14 open. In this case, with the housing main body 20 assembled with the fastening frame 22, the side plate portions 60 of the fastening frame 22 will be extended so as to be situated further inward beyond the rim of the opening of the center recess 28 so that the side plate portions 60 are positioned in opposition to the mass member 16 in the vertical width direction. Thus, the side plate portions 60 will function as barrier walls to prevent the mass member 16 from becoming dislodged from the center recess 28. It would also be possible, for example, to form the opening face of the recess which accommodates the mass member 16 on the upper end face 34, the lower end face 36, or one of the lateral end faces 38 of the housing main body 20, and to cover this open face with the top plate portion 50, the back plate portion 52, or the base plate portion 48 of the fastening frame 22.

Moreover, in the preceding embodiment, with the housing main body 20 assembled in the fastening frame 22, the housing main body 20 is engaged in the fastening frame 22 by juxtaposing the raised catch portion 46 of the housing main body 20 against the catch projection 68 of the fastening frame 22 in the lateral width direction (sideways in FIGS. 1 to 3), as well as additionally juxtaposing the wall of the catch recess 44 of the housing main body 20 and the first spring projection 64 of the fastening frame 22 in the lateral width direction, in order to afford advantages in terms of greater stability of assembly of the housing main body 20 to the fastening frame 22. However, utilizing the first spring projection 64 and the catch recess 44 for the purpose of engagement is not an essential element herein, and depending on considerations such as ease of manufacture it would be acceptable, for example, to retain the first spring projection 64 and wall of the catch recess 44 spaced apart in the lateral width direction, so that the juxtaposed sections of the raised catch portion 46 and the catch projection 68 exclusively constitute the catch location of the housing main body 20 and the fastening frame 22 in the lateral width direction.

Furthermore, in the preceding embodiment, with the accommodating space 14 of the housing main body 20 and the mass member 16 positioned on the same center axis, a small gap is formed throughout between the outside peripheral face of the contact rubber layer 18 and the inside peripheral face of the center recess 28 constituting the peripheral wall of the accommodating space 14, and with the vertical widthwise center section of the mass member 16 positioned at the center section of the accommodating space 14, small gaps are formed respectively between the end faces of the contact rubber layer 18 covering the vertical widthwise ends of the mass member 16 and the lower face of the center recess 28 and the end face of the cover member 26 which constitute the two ends of the accommodating space 14. However, these gaps are not essential elements herein. Specifically, it will be sufficient to position the mass member 16 with the contact rubber layer 18 so that it is housed independently in an unjoined state in the accommodating space 14, so that at times of vibration input the mass member 16 will strike against the inside face of the accommodating space 14 via the contact rubber layer 18. By way of a specific example, even with the contact rubber layer 18 disposed completely filling with no gaps the space between the mass member 16 and the accommodating space 14 in the stationary state in the absence of input of vibration, during times of input of vibration, the contact rubber layer 18 will elastically deform to repeatedly produce gaps between the contact rubber layer 18 and the accommodating space 14, whereby the mass member 16 will elastically strike repeatedly against the inside peripheral wall of the accommodating space 14.

Additionally, while the preceding embodiment described a specific example of the present invention implemented in an automotive engine mount, it is possible for the present invention to be implemented in an automotive body mount or diff mount, or in vibration damping devices for various types of vibrating bodies in non-automotive applications.

What is claimed is:

1. A vibration damping device comprising:
   a hollow housing adapted to be fastened to a component targeted for damping, and having an accommodating space; and
   an independent mass member which is accommodated independently within the hollow housing without being fastened thereto, the vibration damping device adapted to produce vibration damping action based on the independent mass member striking against the hollow housing,
   wherein the hollow housing includes a fastening frame for fastening to the component targeted for damping, and a housing main body providing the accommodating space formed in an interior thereof and intended for attachment to the fastening frame,
   the fastening frame is a press-formed component of a metal plate that has been bent into a "U" shape, and includes: a base plate portion furnished with a section for fastening to the component targeted for damping; a top plate portion disposed spaced apart from and in opposition to the base plate portion; a back plate portion formed connecting the base plate portion with the top plate portion; side panel portions that respectively project inward at widthwise edges of the base, top and back plate portions, and extend between the base, top, and back plate portions; and an opening for insertion of the housing main body formed between edge portions of the base plate portion and the top plate portion on sides thereof opposite from the back plate portion,
   a first spring projection and a second spring projection that project inward are integrally formed on the back plate portion and on one of the base plate portion and the top plate portion of the fastening frame, and a catch projection that projects inward is integrally formed on an other of the base plate portion and the top plate portion; and
   with the housing main body inserted between the opposing faces of the top plate portion and the base plate portion through the opening in the fastening frame, an urging force of the first spring projection is directed against the housing main body from one of the top plate portion and the base plate portion towards the other thereby holding the housing main body pressed against the other of the top plate portion and the base plate portion, while an urging force of the second spring projection is directed against the housing main body towards the opening side from the back plate portion causing the housing main body to become engaged by the catch projection, for attaching the housing main body to the fastening frame and preventing the housing main body from slipping out through the opening of the fastening frame.

2. The vibration damping device according to claim 1, wherein at least one of the first spring projection, the second spring projection, and the catch projection is formed by cutting and bending a part of the fastening frame.

3. The vibration damping device according to claim 1, wherein the first spring projection is formed in the top plate portion of the fastening frame, and the housing main body is held in abutment pressed directly against the base plate portion.

4. The vibration damping device according to claim 1, wherein the first spring projection and a catching portion of the catch projection adapted to mate with the housing main body are formed extending for a prescribed length in a widthwise direction of the fastening frame.

5. The vibration damping device according to claim 1, wherein the housing main body is made of a synthetic resin material.

6. The vibration damping device according to claim 1, wherein the base plate portion of the fastening frame extends outward appreciably beyond the top plate portion towards a side opposite the back plate portion to form a fastening section having a bolt passage hole formed therein; the fastening frame is mounted onto the component to be damped through screw-fastening of a bolt which has been passed through the bolt passage hole to the component to be damped; and a head of the bolt which projects above the base plate portion constricts the opening for the housing main body to provide a fail-safe mechanism for preventing the housing main body from slipping out through the opening.

7. The vibration damping device according to claim 1, wherein the first spring projection and the catch projection have a flat rectangular shape inclined with respect to the top plate portion or the base plate portion, while the second spring projection has a flat rectangular shape inclined with respect to the back plate portion, and each of the first spring projection, the second spring projection and the catch projection has a sloping portion at a basal end thereof and a flat portion at a distal end, the flat portions extending parallel to the top plate portion, the back plate portion, and the base plate portion, respectively.

8. The vibration damping device according to claim 7, wherein a distal end section of the flat portion of the catch projection situated facing a back plate portion serves as a catch portion to be mated with the housing body, and a distance separating the catch portion of the catch projection and the back plate portion is smaller than the distance separating the opening of the fastening frame and the back plate portion.

9. The vibration damping device according to claim 7, wherein a height dimension: H1 from an upper end face to a lower end face of the housing main body is slightly smaller than a height dimension of the opening of the fastening frame, and is greater than a distance: L1 equivalent to a distance between opposing face of the top plate portion and the base plate portion net of the height dimension: h1' of the first spring projection and the height dimension: h3 of the catch projection.

10. A method of manufacturing a vibration damping device that includes a hollow housing adapted to be fastened to a component targeted for damping, and having an accommodating space, and an independent mass member which is accommodated independently within the hollow housing without being fastened thereto, the vibration damping device adapted to produce vibration damping action based on the independent mass member striking against the hollow housing, wherein the hollow housing includes a fastening frame for fastening to the component targeted for damping, and a housing main body providing the accommodating space formed in an interior thereof and intended for attachment to the fastening frame, the fastening frame is a press-formed component of a metal plate that has been bent into a "U" shape, and includes: a base plate portion furnished with a section for fastening to the component targeted for damping; a top plate portion disposed spaced apart from and in opposition to the base plate portion; a back plate portion formed connecting the base plate portion with the top plate portion; side panel portions that respectively project inward at widthwise edges of the base, top and back plate portions, and extend between the base, top, and back plate portions; and an opening for insertion of the housing main body formed between edge portions of the base plate portion and the top plate portion on sides thereof opposite from the back plate portion, a first spring projection and a second spring projection that project inward are integrally formed on the back plate portion and on one of the base plate portion and the top plate portion of the fastening frame, and a catch projection that projects inward is integrally formed on an other of the base plate portion and the top plate portion; and with the housing main body inserted between the opposing faces of the top plate portion and the base plate portion through the opening in the fastening frame, an urging force of the first spring projection is directed against the housing main body from one of the top plate portion and the base plate portion towards the other thereby holding the housing main body pressed against the other of the top plate portion and the base plate portion, while an urging force of the second spring projection is directed against the housing main body towards the opening side from the back plate portion causing the housing main body to become engaged by the catch projection, for attaching the housing main body to the fastening frame and preventing it from slipping out through the opening of the fastening frame, the method comprising the steps of:

accommodating the independent mass member within the accommodating space of the housing main body independently without being fastened to the housing main body;

inserting the housing main body through the opening of the fastening frame and between the opposing faces of the top plate portion and the base plate portion and displacing it towards the back plate portion while inducing resilient deformation of at least one of the first spring projection and the catch projection in abutment against the housing main body, this deformation being directed towards an outside from between the opposing faces of the top plate portion and the base plate portion;

positioning an inserted distal end of the housing main body in abutment against the second spring projection thereby inducing resilient deformation of the second spring projection towards an outside from between the opposing faces of the top plate portion and the base plate portion, while engaging the housing main body with the catch projection; and with the housing main body held pressed against the other of the top plate portion and the base plate portion under the urging force of the first spring projection exerted on the housing main body from one of the top plate portion and the base plate portion towards the other, and the housing main body held in a state of engagement with the catch projection under the urging force of the second spring projection exerted on the housing main body towards the opening side from the back plate portion, attaching the housing main body to the fastening frame and preventing the housing main body from becoming dislodged through the opening of the fastening frame.

* * * * *